United States Patent [19]

Mestre et al.

[11] 4,199,342
[45] Apr. 22, 1980

[54] PROCESS OF IMPARTING A PERMANENT CURVATURE TO A SHEET OF GLASS

[75] Inventors: Pierre Mestre; Henri Prévost, both of Maubeuge, France

[73] Assignee: BFG Glassgroup, Paris, France

[21] Appl. No.: 967,867

[22] Filed: Dec. 7, 1978

[30] Foreign Application Priority Data

Dec. 30, 1977 [GB] United Kingdom ............ 54343/77

[51] Int. Cl.² .......................................... C03B 23/02
[52] U.S. Cl. ...................................... 65/106; 65/104
[58] Field of Search ............... 65/103, 104, 106, 273, 65/275, 107

[56] References Cited

U.S. PATENT DOCUMENTS

| | | | |
|---|---|---|---|
| 2,442,242 | 5/1948 | Lewis | 65/106 X |
| 3,208,839 | 9/1965 | Nordberg | 65/106 X |
| 3,600,150 | 8/1971 | Rougeux | 65/104 X |
| 3,753,673 | 8/1973 | Pickard et al. | 65/106 |

*Primary Examiner*—Arthur D. Kellogg
*Attorney, Agent, or Firm*—Cushman, Darby & Cushman

[57] ABSTRACT

An untempered sheet of glass is given a predetermined curvature by means of pre-heated forming dies (3,4 in FIG. 1). The glass sheet (1) is not pre-heated or is heated only to a relatively low temperature prior to being inserted between the dies. Heat transfer from the dies to the glass prior to closure of the dies produces or assists in producing in the thickness of the glass sheet a transitory thermal stress gradient which gives resistance to breakage under bending forces. The absence of high temperature pre-heating of the sheet is conducive to a more predictable stress distribution pattern over the area of the sheet prior to bending. The process enables predetermined sheet curvatures to be achieved with higher degrees of accuracy.

14 Claims, 3 Drawing Figures

PROCESS OF IMPARTING A PERMANENT CURVATURE TO A SHEET OF GLASS

This invention relates to a process of imparting a permanent curvature to a sheet of glass by subjecting the sheet to bending forces between pre-heated forming dies having complementary curved surfaces.

According to conventional practice, prior to subjecting glass sheets to bending forces by co-operating dies to impart a permanent curvature to the sheets, the sheets are heated to a high temperature to bring the glass to a condition such that the sheets can withstand the bending forces without breaking. The pre-heating and bending of the glass sheets takes up appreciable time, which is a disadvantage particularly in industrial plant working on a mass production basis. The temperature to which a given glass sheet is pre-heated prior to bending to a given curvature depends in part on the period of time over which the bending operation is performed. Lowering of the pre-heating temperature and thus shortening of the pre-heating time necessitates slowing down of the bending operation.

In order to permit glass sheets to be bent more quickly without having to heat them to very high temperatures it has been proposed to subject the glass sheets to a chemical tempering treatment prior to applying the bending forces. The art of chemical tempering glass sheets is well known per se. It involves the production of compressive stresses in surface layers of the glass by causing ions from a contacting medium to enter such surface layers. However, even this procedure necessitates heating of the glass sheets to fairly high temperatures before the bending operation. For example, sheets of ordinary soda lime glass normally have to be heated to temperatures of at least 400° to 500° C. for the purpose of the chemical tempering treatment.

It has been found that when glass sheets are bent by forming dies after pre-heating of the sheets to the high temperatures involved in the known processes above referred to it is very difficult to confer on them a curvature which corresponds within very narrow tolerances to a predetermined curvature, even when employing accurately machined dies and carefully controlling the pre-heating of the glass and the temperature of the dies before and during their action on the glass sheets. This difficulty is particularly in evidence when bending thin glass.

There is a need for a process by which a predetermined curvature can be imparted to glass in sheet form, including thin glass, e.g. glass less than 3 mm in thickness, with a high degree of accuracy. Such accuracy is highly desirable for example when shaping pieces of glass for use in the fabrication of large concave mirrors as employed for concentrating solar radiation.

The present invention provides a process which fulfils or contributes to the fulfilment of that need. In addition the invention enables such accurate bending of sheets to be achieved in favourably short processing times.

According to the present invention there is provided a process of imparting a permanent curvature to a sheet of glass by subjecting the sheet to bending forces between pre-heated forming dies having complementary curved surfaces, characterised in that the sheet is inserted in untempered condition between the pre-heated dies and the dies are closed while a transitory thermal stress gradient exists in the thickness of the sheet due at least in part to heat transfer from such dies and the dies are opened after at least partial relief of the bending stresses.

The process according to the invention enables sheets of glass to be formed to a predetermined curvature with a high degree of accuracy.

The process according to the invention does not necessitate pre-heating of a glass sheet, i.e. heating of the sheet prior to its location between the forming dies, to the high temperature necessary when carrying out the known processes hereinbefore referred to. From tests it has been ascertained that when adopting a conventional process as hereinbefore referred to, unpredictable thermal stress gradients are present in the glass when the bending forces begin to be applied by the forming dies. Those stress gradients along or across the sheet arise during the pre-heating of the sheet and/or during transference of the pre-heated sheet to the position between the forming dies. The bending stresses imposed by the forming dies are superimposed on the thermal stress pattern and in consequence the stress distribution over the area of the sheet on closure of the dies is not a true function of the two- or three-dimensional profile of the co-operating die surfaces.

In carrying out the present invention the creation of potentially harmful fortuitous thermal stress gradients within the area of the glass sheet by pre-heating thereof are avoided or substantially so. This is thought to be the probable explanation of the improvment resulting from the present invention. In carrying out the present invention, the stress distribution pattern imposed on the sheet of glass on closure of the forming dies is accurately dependent on the geometry of the die surfaces. If the forming dies are opening while residual bending stresses remain in the glass sheet, there will be some elastic recovery of the sheet but this can be allowed for in the design of the dies as known per se. Preferably however the dies are opened only after all or substantially all bending stresses have become relaxed so that the permanent curvature of the sheet corresponds or substantially corresponds with that of the die surfaces.

Pre-heating of the glass before it is placed between the forming dies is not excluded by the present invention but if such pre-heating occurs the temperature to which the glass is raised is very much lower than that attained by pre-heating in the conventional processes. This is implicit in the fact that when the glass is inserted between the pre-heated forming dies a transitory stress gradient within the thickness of the glass sheet is set up as a result of heat transfer from the dies.

By heat transfer from the dies, opposed surface layers of the glass are raised to a higher temperature than the inner or core layers of the glass. In consequence the surface layers become compressively stressed while the inner layers are placed in tension. This is the form of the transitory thermal stress gradient which exists within the thickness of the sheet during closure of the dies. The presence of the compressive surface stresses at the side of the glass sheet which becomes increasingly convexly curved during closing of the dies increases the maximum bending which that side of the sheet can withstand so that the risk of breakage of the glass is reduced. The sheet can be bent to a given curvature more quickly than would otherwise be possible without risk of breakage.

A further advantage of the invention is its relative implicity due to the absence of high temperature pre-treatment of the glass. Handling of the glass to bring it into position for bending is much easier and there is little or no risk of spoiling the glass surfaces by handling pressures. This is of great importance for ensuring that the final product has predetermined optical qualities.

In preferred embodiments of the invention the glass sheet is not subjected to any pre-heating prior to its insertion between the forming dies. The absence of preheating means that there are no temperature differentials between different regions within the area of the sheet which by setting up thermal stresses could affect the final geometry of the sheet. In addition the entire omission of pre-heating makes for the greatest simplicity of the process and enables the total processing time to be kept to a minimum. Moreover by inserting the glass sheet in unheated condition there is a greater temperature difference between the sheet and the dies and this is an advantage in enabling sheets to be bent to smaller radii of curvature and/or in shorter time.

In other satisfactory embodiments of the invention, the glass sheet is subjected to some pre-heating but its temperature immediately prior to positioning between the forming dies is not more than 250° C. and most preferably not more than 200° C. Such maximum temperatures are specified more particularly for sheets of ordinary soda-lime glass. For sheets of certain other glasses a somewhat higher maximum pre-heating temperature may be allowable while ensuring a comparably acceptable condition of the glass sheet prior to insertion between the dies.

The period of time between sheet insertion and complete closure of the dies can be considered in two phases, namely a first phase (hereafter called "pre-bending phase") in which the sheet is out of contact with one or both dies and a second phase (hereafter called "bending phase") in which the sheet is in contact with both dies. In the prebending phase, the glass sheet can be supported between but independently of the dies, e.g. through the agency of a refractory protective material extending between the sheet of glass and the lower die. Alternatively the sheet can be supported by the lower die.

Generally speaking if the glass sheet is supported by the lower die during the pre-bending phase so that heat transfer to the sheet takes place during that phase both by radiation from the dies and by conduction from the lower die, the duration of that phase should be shorter, other things being equal.

In preferred processes according to the invention the said pre-bending phase is of less than 30 seconds and most preferably of less than 10 seconds duration. Pre-bending phases at the upper end of that duration range are generally more acceptable if the sheet is initially supported out of contact with both dies and is located between plies of protective material which reduce the rate at which the sheet is heated by radiant heat from the dies. In other cases, and in particular in the absence of such protective material, the pre-bending phase should generally be appreciably less than 30 seconds and is preferably less than 10 seconds in duration.

It is particularly important for the bending phase, which is the phase during which the dies are closing and both of them are in contact with the glass sheet, to be kept very short. Preferably that phase is not more than 5 seconds and is most preferably less than 3 seconds in duration.

For the best and most reliable results the period of time between insertion of the glass sheet between the dies and their complete closure should be kept as short as possible, consistent of course with avoiding breaking stresses on the glass. In any event the said period of time must be sufficiently short to retain the advantage of the transitory thermal stress gradient within the thickness of the sheet resulting from heat transfer from the dies and to avoid potentially harmful thermal stress gradients between different points within the sheet area due to differences in the heat transfer rates to different parts of the sheet.

The most favourable value of the said time period will depend on a number of other factors in any given process, including the temperature and spacing of the dies, the temperature to which the sheet was pre-heated (if at all), the thickness of the glass sheet and the extent of curvature to be imparted to it by the dies. In preferred processes of the invention the said time period is less than 20 seconds and most preferably less than 15 seconds.

The temperature of the forming dies and the residence time of the glass sheet between the dies are preferably such that the temperature of the glass does not rise above a value corresponding to a glass viscosity of $10^{10}$ poises. Such a relatively low temperature bending operation is favoured inter alia because of the relatively low risk of spoiling of the faces of the glass sheet. In the most recommended embodiments of the invention the temperature of the glass does not rise above a value corresponding to a glass viscosity of $10^{13}$ poises, which corresponds to the annealing point.

It is important to avoid distortion of the geometry of the bent sheet by thermal stresses due to the occurrence of temperature gradients within the sheet area during cooling. The risk of distortion due to such gradients depends on their steepness and on the temperature values. Once the sheet has cooled to a certain temperature level inequalities in temperature area harmless. These considerations should be taken into account in selecting the moments of opening the dies and subsequent removal of the glass sheet from between them, in relation to the cooling schedule. Generally, when the dies are opened with the glass sheet still at very elevated temperature any temperature difference between different zones within the area of the sheet should be less than 5° C. at the moment the dies are opened. However the maximum temperature differential permissible in any given case will depend upon various factors including the quality standard set for the final product.

Any tendency for the glass sheet to flatten slightly under its own weight when it is removed from the mould can be avoided by allowing or causing greater cooling of the sheet before such removal. Cooling can be promoted e.g. by blowing air across the top of the glass sheet while it lies in the open mould.

In carrying out the invention protection to the faces of the glass sheet can if required be afforded by a relatively soft refractory material (e.g. the refractory tissue marketed under the Trade Mark "Refrasil") interposed between the sheet and the surfaces of the dies. The protection may for example be afforded by a single piece of the protective material folded upon itself, the glass sheet being disposed between the two plies of material.

In particularly important embodiments of the invention it is applied for bending a sheet of glass less than 3 mm and in some cases less than 2 mm in thickness.

The invention is of special value where accurate optical specifications are called for. This is due to the fact that sheets of glass can be accurately bent to a predetermined curvature and without causing impairment of the surfaces of the glass.

The invention is also of particular advantage for bending glass sheets to curvatures of large radius, say above 3 meters and more particularly above 5 meters.

Accordingly one very important field of use for the invention is the fabrication of solar energy reflectors as already referred to. In that field sheets of glass may be required to be accurately bent to curvatures having radii up to 20 meters or even more. When the invention is so applied in the manufacture of a solar energy reflector, each sheet of glass after being bent is made into a mirror by application of reflecting and protective coatings, e.g., by applying a silver coating and one or more protective coatings of paint and/or other material. Generally a multiplicity of such mirrors are assembled to form a single solar energy reflector.

The invention includes sheets of glass which have been bent by a process according to the invention as hereinbefore defined, and also includes any curved radiant energy reflector incorporating an assembly of such sheets of glass.

Reference will now be made to the accompanying diagrammatic drawings showing by way of example certain apparatus which can be used in carrying out processes according to the invention: In these drawings.

Figure 1:
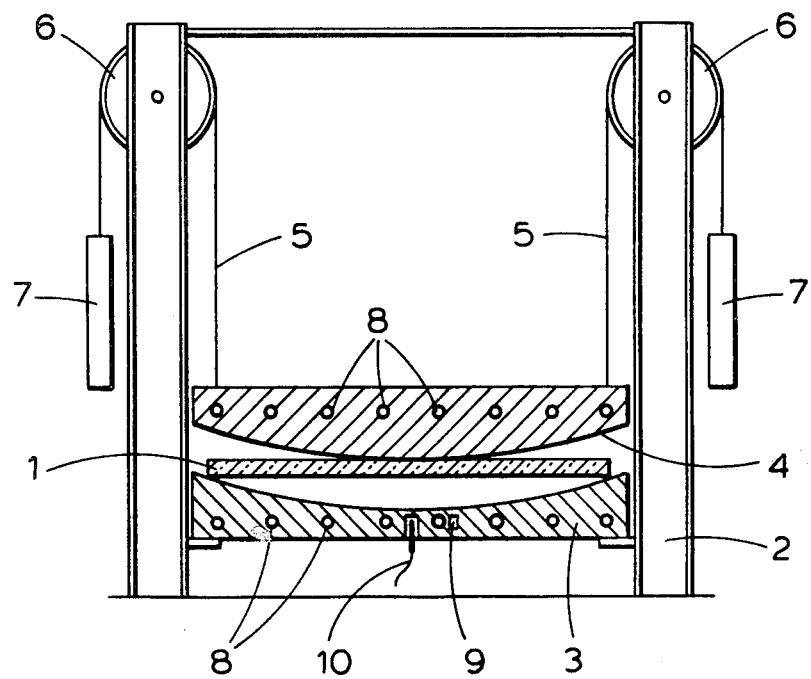
FIG. 1 is an elevation, partly in cross-section, of a forming press.

FIG. 1 shows a sheet of glass 1 in position between the forming dies of a bending press. The press comprises a frame 2 which supports a lower forming die 3 in fixed position. An upper forming die 4 is mounted on the frame for vertical guided motion towards and away from the die 3. The die is attached to cables 5 which pass over pulley wheels 6 and carry counter-weights 7. Lowering and raising of the upper die is effected by a mechanism (not shown) which is coupled to the pulley wheels 6.

The forming dies incorporate electrical resistance heaters 8. The lower die incorporates a thermocouple 9 disposed close to one of the resistors. This thermocouple limits heat output by the resistance heaters. A second thermocouple 10 is installed in a socket formed in the lower die so that that thermocouple is as near as possible to the forming surface of that die. The upper die 4 has an effective weight of 200 kg.

Figure 2:
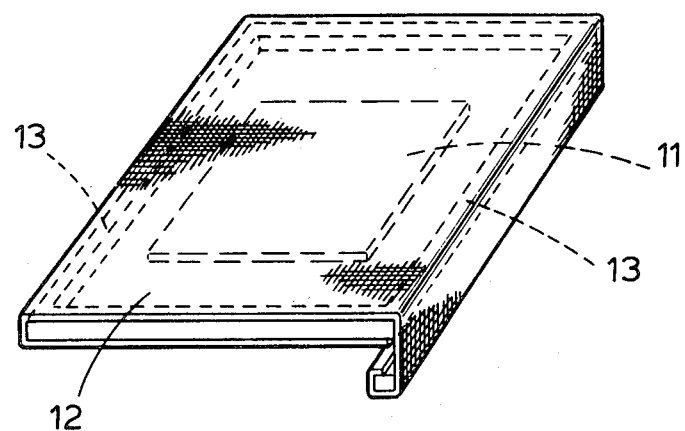
FIG. 2 is a perspective view of a protective envelope in which a sheet of glass is enclosed preparatory to being bent.

In order to protect a glass sheet from harmful thermal shocks and possible consequential deformations, and in order to promote uniform cooling of the glass sheet on completion of the bending operation, the sheet can be enclosed, prior to introduction into the bending press, in a protective envelope as represented in FIG. 2. The figure shows a glass sheet 11 in position in the envelope. The envelope, 12, comprises layers of a refractory tissue such as that marketed under the trade mark "Refrasil", carried by a frame 13.

Figure 3:
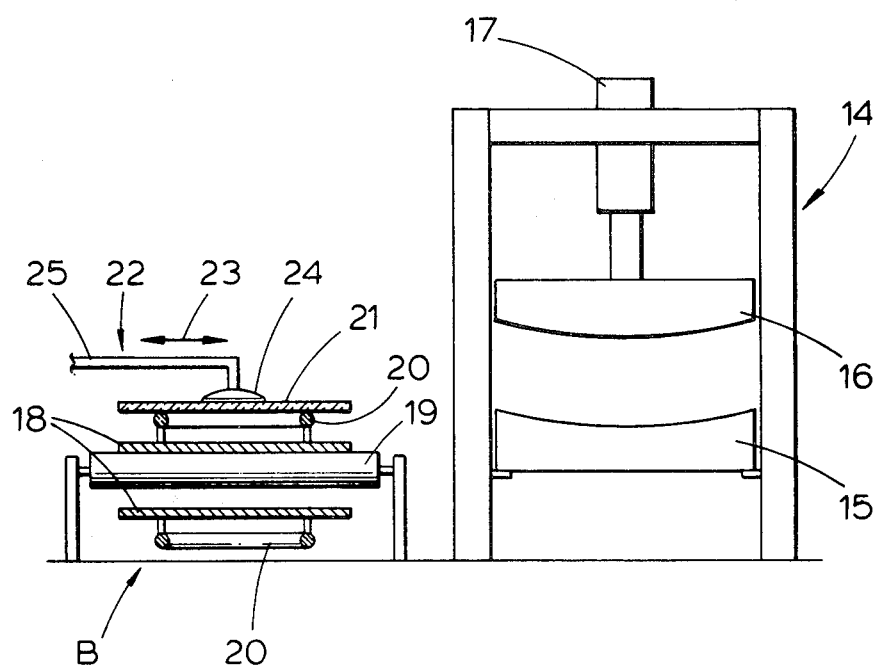
FIG. 3 is an elevation of a plant for automatically and repetitively performing a process according to the invention.

The plant represented in FIG. 3 comprises a bending press 14 having lower and upper forming dies 15 and 16. The upper die 16 is displaceable towards and away from the lower die by means of a screw-clamp mechanism 17. An endless conveyor comprising an endless belt 18 travelling on rollers such as 19 serves for transporting glass sheets to and from the bending station where the bending press is located. The belt 19 is fitted at spaced positions along its length with supports for the glass sheets. Each support comprises a ring 20 on which a glass sheet such as 21 is placed. The ring may, e.g., be an iron ring coated with fibreglass or other refractory material.

The conveyor is moved stepwise by a mechanism (not shown) so as to bring the glass sheets one by one to the bending station where the press is located.

For transferring the glass sheets to the press there is a handling device 22 and means (not shown) for reciprocating the device as suggested by the arrows 23. The handling device comprises a suction type holder 24 carried by an arm 25 which is movable parallel to itself under automatic control to bring the holder above the glass sheet awaiting transfer to the press. Suction force is exerted via the holder and it is displaced so as to transfer the sheet to the press, whereafter the holder is retracted. After the bending operation and sufficient cooling of the bent sheet, the handling device 22 is operated to return the glass sheet to its support on the conveyor. The conveyer is then advanced a further step to bring the next sheet into position ready for transfer to the press.

The following are examples of processes according to the invention:

EXAMPLE 1

Octagonal pieces of glass measuring 310 mm along a diagonal and having a thickness of 2.5 mm were bent to spherical cap form with a radius of curvature of 4.6 meters, using a bending press having NS 30 stainless steel forming dies with co-operating forming surfaces of that radius of curvature. One of the forming dies incorporated a thermocouple at a central position within the body of the die, close to its forming surface, for the purpose of controlling the die temperature at that zone.

The forming dies were preheated at 450° C.

Each piece of glass was placed at ambient temperature between two glass tissue layers and each of such pieces together with the enclosing glass tissue was placed in turn between the preheated forming dies and bent between the dies to a corresponding curvature. The glass tissue reduced the thermal shock on the glass and afforded protection to the surfaces of the glass against mechanical damage by the forming dies. In addition the tissue promoted uniform pressure distribution over the area of the glass.

Immediately after location of each piece of glass and the protecting tissue between the forming dies, the dies were closed within a period of 1 second. Once the closure of the dies was complete the bending press was introduced into a furnace having a temperature stabilised at 520° C. The press was removed from the furnace when the temperature sensed by the aforesaid thermocouple reached 490° C. The residence time of the press within the furnace was 20 minutes. On removal from the furnace the bending press was allowed to cool and the piece of bent glass was then removed from the press.

The pieces of bent glass were found to be free from residual stresses and were capable of being cut to different shapes. The glass from which the octagonal pieces were initially cut was annealed glass and after the bending process the pieces were found to have retained the properties conferred by that annealing treatment.

EXAMPLE 2

In this example use was made of a bending press as above described with reference to FIG. 1 of the accompanying drawings.

An unheated flat piece of glass 1 was placed in position between the two complementary forming dies 3 and 4 of the press. The dies were electrically preheated to a temperature of 640° C. as measured by thermocouple 9. After placing the unheated glass sheet between the preheated dies, the upper die 4 was lowered into contact with the glass sheet and was then allowed to descend by gravity against the bending resistance of the glass sheet. This bending period lasted for less than 1 second. The thermocouple 10 was set to interrupt heating of the dies when the temperature sensed by that thermocouple reached 580° C. That temperature was reached 5 minutes after the press had fully closed. The upper die 4 was then raised. The bent glass sheet was left in place on the lower die for about 1 minute to allow the glass to set and become resistant to deformation by handling.

The lower die 3 is advantageously provided with passages communicating with the top face of that die to facilitate removal of the glass sheet from that die. If required such removal can be further facilitated by blowing air through those passages.

In a modification of the foregoing process, after raising the upper die, air was blown over the top of the glass sheet to accelerate cooling. The sheet of glass could then be removed sooner. Such accelerated cooling can be carried out with advantage e.g. when bending a sheet of a size and to a curvature such that it would otherwise tend to flatten on removal from the mould unless left in the mould for a longer period.

A modification of the above process resided in the use of an envelope 12 as above described with reference to FIG. 2 of the accompanying drawings. The envelope was appreciably larger than the piece of glass 1 and larger than the area of the press dies. The envelope with the sheet of glass enclosed was placed in position in the press with the envelope frame outside the boundaries of the dies. After the bending operation the envelope enclosing the bent glass was handled by its frame 8. The bent glass was kept in the envelope 7 during cooling. The envelope ensured uniform cooling of the glass and protected it from thermal shocks which might have caused deformations of the glass. The envelope 7 also protected the glass from surface damage during the bending operation.

We claim:

1. A process of imparting a permanent curvature to a sheet of glass by subjecting the sheet to bending forces between pre-heated forming dies having complementary curved surfaces, characterised in inserting the sheet in untempered condition between the pre-heated dies while its temperature prior to its insertion does not exceed 250° C. and is less than the temperature of the dies whereby heat is transferred from the dies to the sheet, closing the dies while a transitory thermal stress gradient exists in the thickness of the sheet due at least in part to heat transfer from such dies and opening the dies after at least partial relief of the bending stresses.

2. A process according to claim 1, wherein the sheet of glass is not subjected to any heating prior to its insertion between the forming dies.

3. A process according to claim 1, wherein the glass is pre-heated to a temperature of not more than 200° C.

4. A process according to claim 1, claim 2 or claim 3, wherein following insertion of the sheet between the dies it remains out of contact with one or both dies for less than 30 seconds.

5. A process according to claim 4, wherein following insertion of the sheet between the dies it remains out of contact with one or both dies for less than 10 seconds.

6. A process according to claim 1, claim 2 or claim 3, wherein the period of time for which both dies are in contact with the glass during closing of the dies is not more than 5 seconds.

7. A process according to claim 6, wherein the said period of time for which both dies are in contact with the glass during closing of the dies is less than 3 seconds.

8. A process according to claim 1, claim 2 or claim 3, wherein the period of time between insertion of the glass sheet between the dies and their complete closure is less than 20 seconds.

9. A process according to claim 8, wherein the said period of time between insertion of the glass sheet between the dies and their complete closure is less than 15 seconds.

10. A process according to claim 1, claim 2 or claim 3, wherein the temperature of the dies and the residence time of the glass sheet between the dies are such that the temperature of the glass does not rise above a value corresponding to a glass viscosity of $10^{10}$ poises.

11. A process according to claim 10, wherein the temperature of the dies and the residence time of the glass sheet between the dies are such that the temperature of the glass does not rise above a value corresponding to a glass viscosity of $10^{13}$ poises.

12. A process according to claim 1, claim 2 or claim 3, wherein after opening of the dies cooling of the glass is promoted by blowing air over it.

13. A process according to claim 1, claim 2, or claim 3, applied for imparting curvature to a sheet of glass less than 3 mm in thickness.

14. A process according to claim 1, claim 2 or claim 3, applied for bending a sheet of glass to a radius of more than 3 meters.

* * * * *